United States Patent [19]
Nishigaki et al.

[11] Patent Number: 5,901,292
[45] Date of Patent: May 4, 1999

[54] COMPUTER SYSTEM HAVING EXPANSION UNIT

[75] Inventors: Nobutaka Nishigaki, Tokyo; Nobutaka Nakamura, Hidaka, both of Japan

[73] Assignee: Kabushiki Kaisha Toshiba, Tokyo, Japan

[21] Appl. No.: 08/808,414

[22] Filed: Feb. 28, 1997

[30] Foreign Application Priority Data

Mar. 1, 1996 [JP] Japan .................................. 8-044920

[51] Int. Cl.⁶ .................................................. G06F 13/00
[52] U.S. Cl. ........................................... 395/283; 395/311
[58] Field of Search ..................................... 395/280, 281, 395/282, 283, 309, 311; 326/21, 26, 31, 33

[56] References Cited

U.S. PATENT DOCUMENTS

| | | | |
|---|---|---|---|
| 4,614,880 | 9/1986 | Go et al. .............................. | 307/200 A |
| 4,835,737 | 5/1989 | Herrig et al. . | |
| 5,377,357 | 12/1994 | Nishigaki et al. ....................... | 395/281 |
| 5,598,537 | 1/1997 | Swanstrom et al. ..................... | 395/281 |
| 5,598,539 | 1/1997 | Gephardt et al. ........................ | 395/281 |
| 5,627,974 | 5/1997 | Watts, Jr. et al. ........................ | 395/281 |
| 5,664,118 | 9/1997 | Nishigaki et al. ....................... | 395/283 |
| 5,758,103 | 5/1998 | Oh ............................................ | 395/283 |

*Primary Examiner*—Meng-Ai T. An
*Assistant Examiner*—Xuan M. Thai
*Attorney, Agent, or Firm*—Finnegan, Henderson, Farabow, Garrett & Dunner, L.L.P.

[57] ABSTRACT

An analog switch is provided to be connected to the signal lines of a bus of a computer body to be led to an expansion unit. When the signal lines of the bus of the expansion unit are pulled up, a high value is sent to the signal lines of the bus of the computer body. When the signal lines of the bus of the expansion unit are pulled down, a low value is sent to the signal lines of the bus of the computer body. After the potential levels of the signal lines of one bus equal to those of the signal lines of the other bus by the high value or the low value sent, a connection control gate array sets the analog switch on. This can allow the signal lines of both buses to be connected together without causing a transient phenomenon even while the bus cycle is being executed.

16 Claims, 8 Drawing Sheets

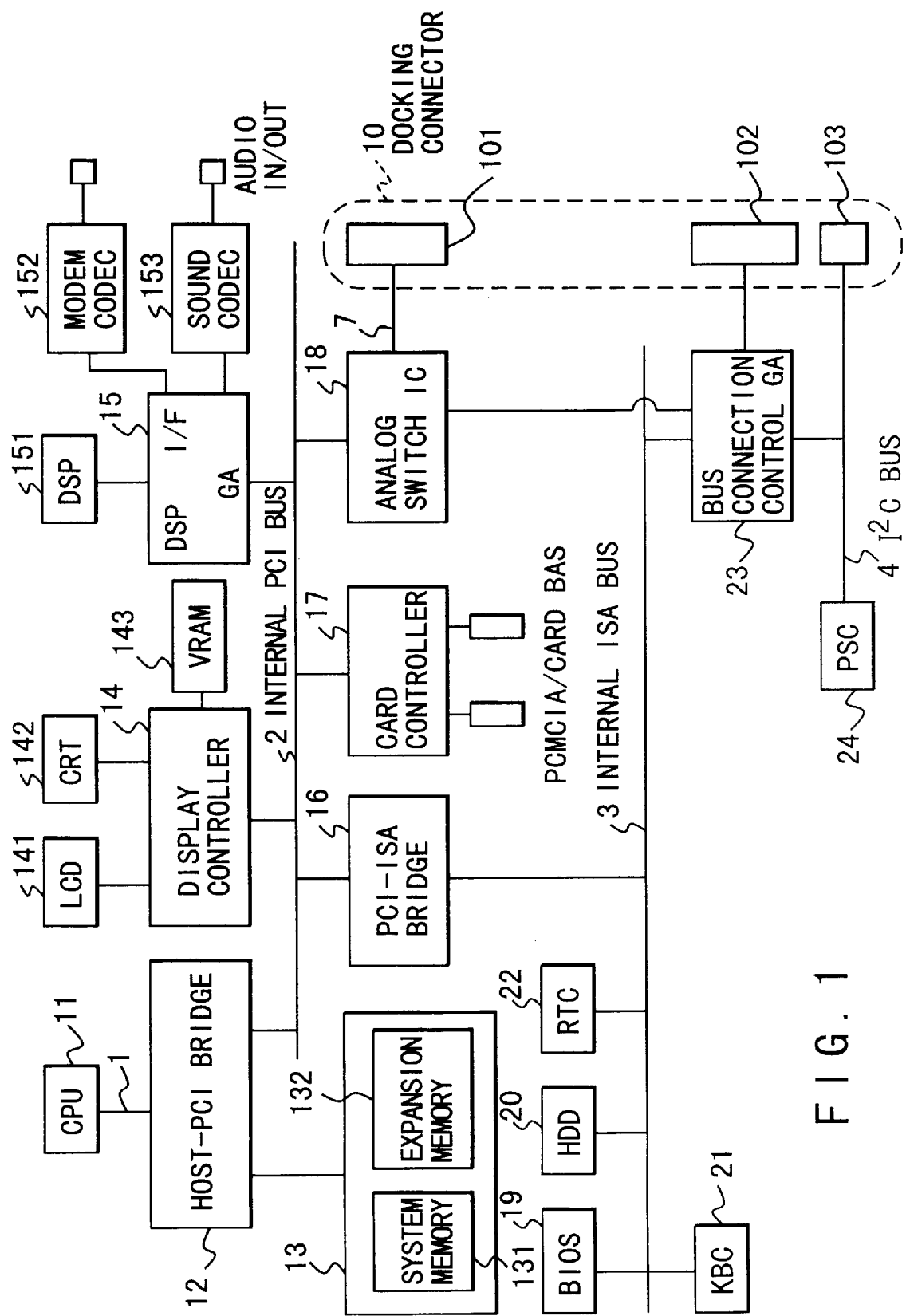
F I G. 1

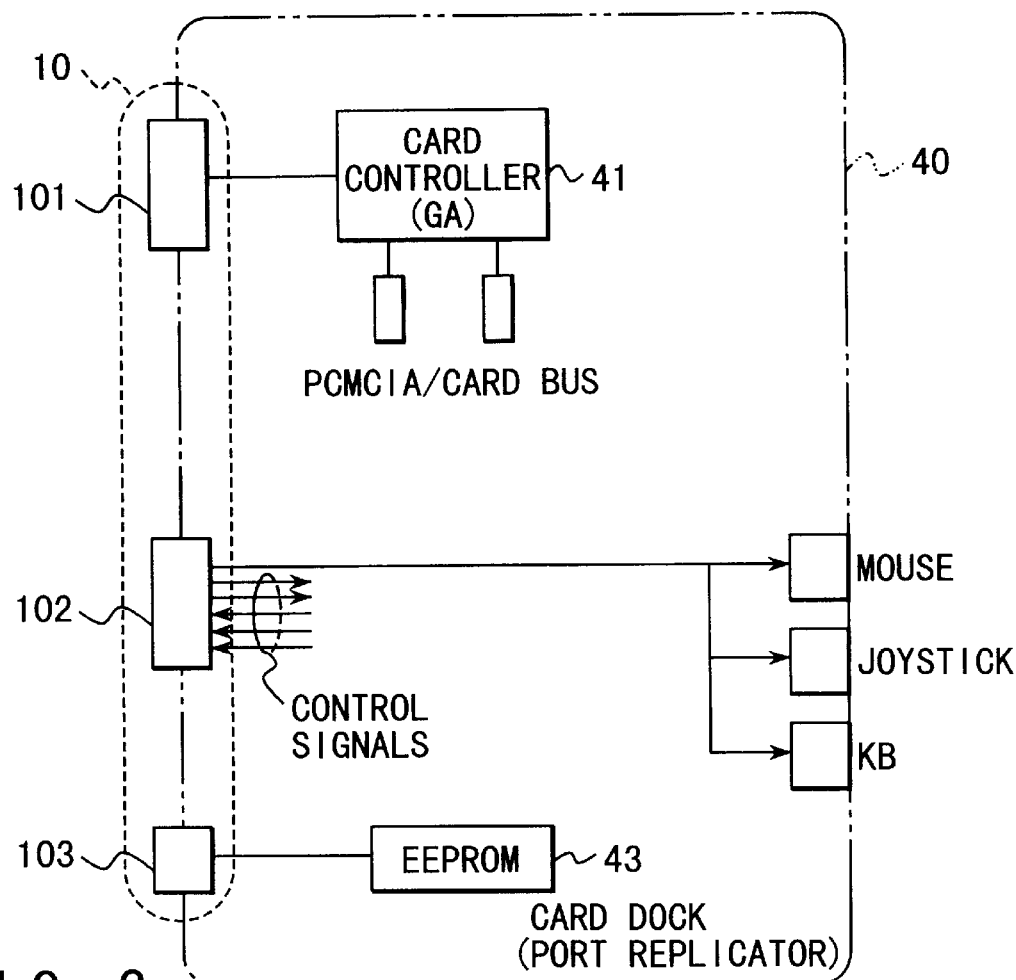
F I G. 3
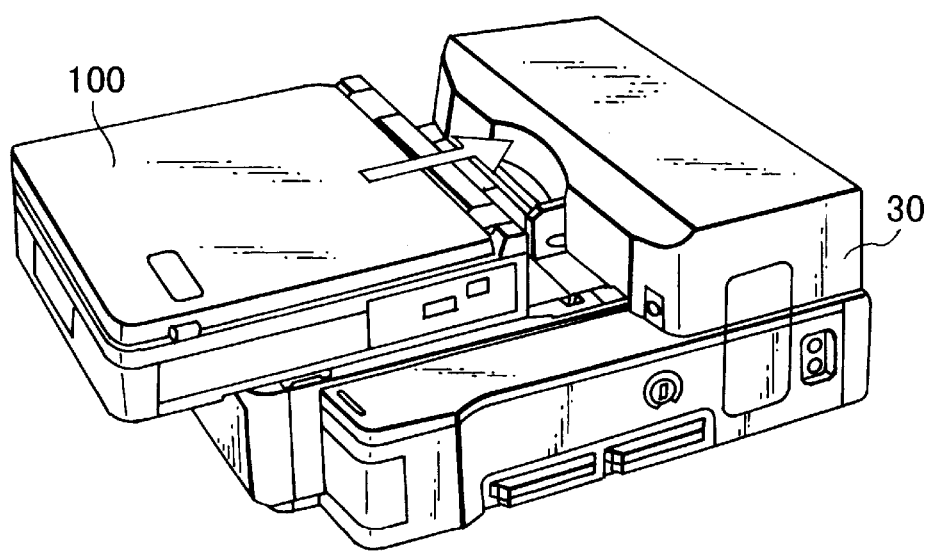
F I G. 4

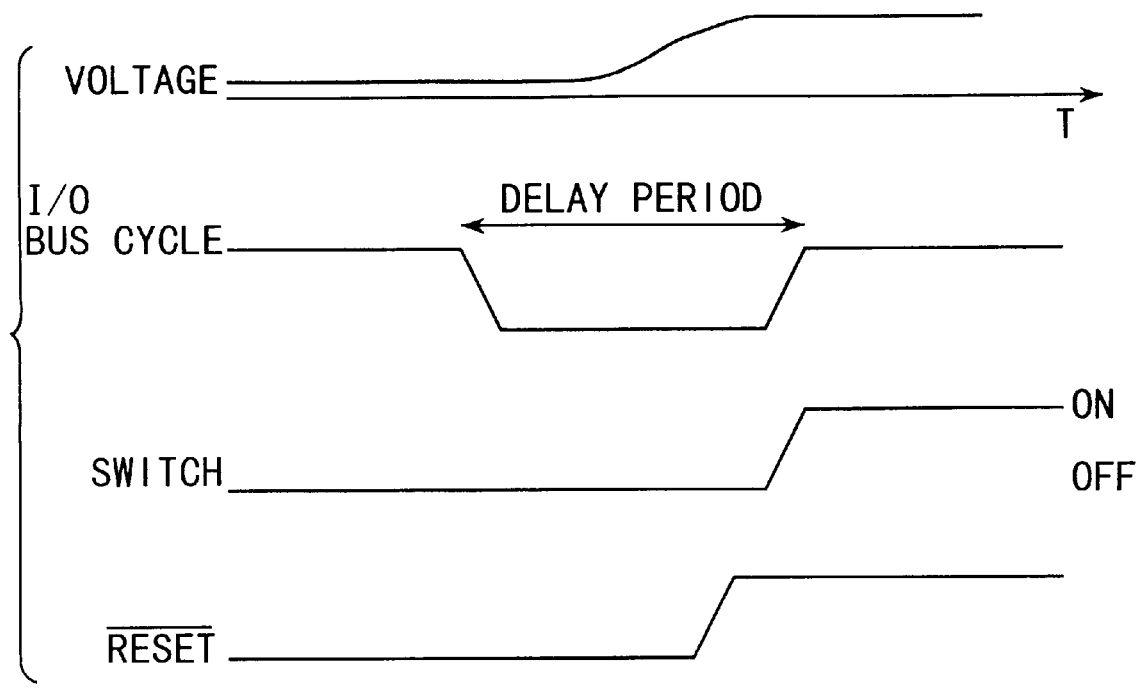
F I G. 10
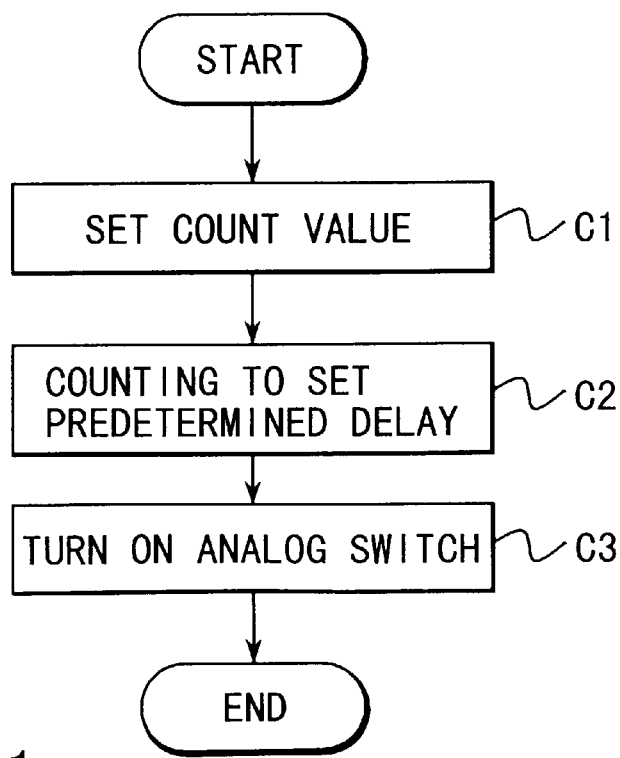
F I G. 11

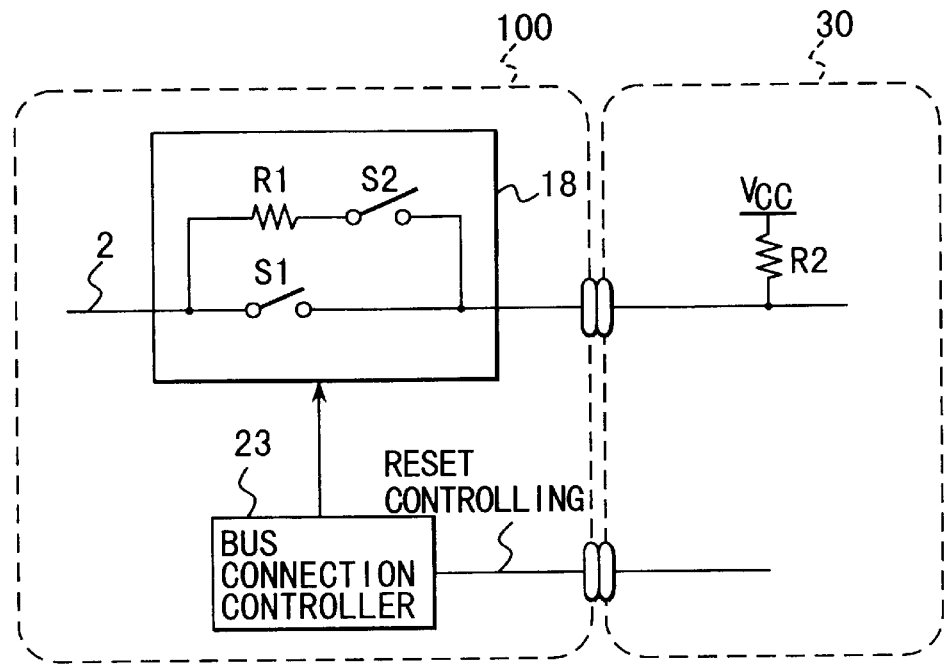
F I G. 1 2
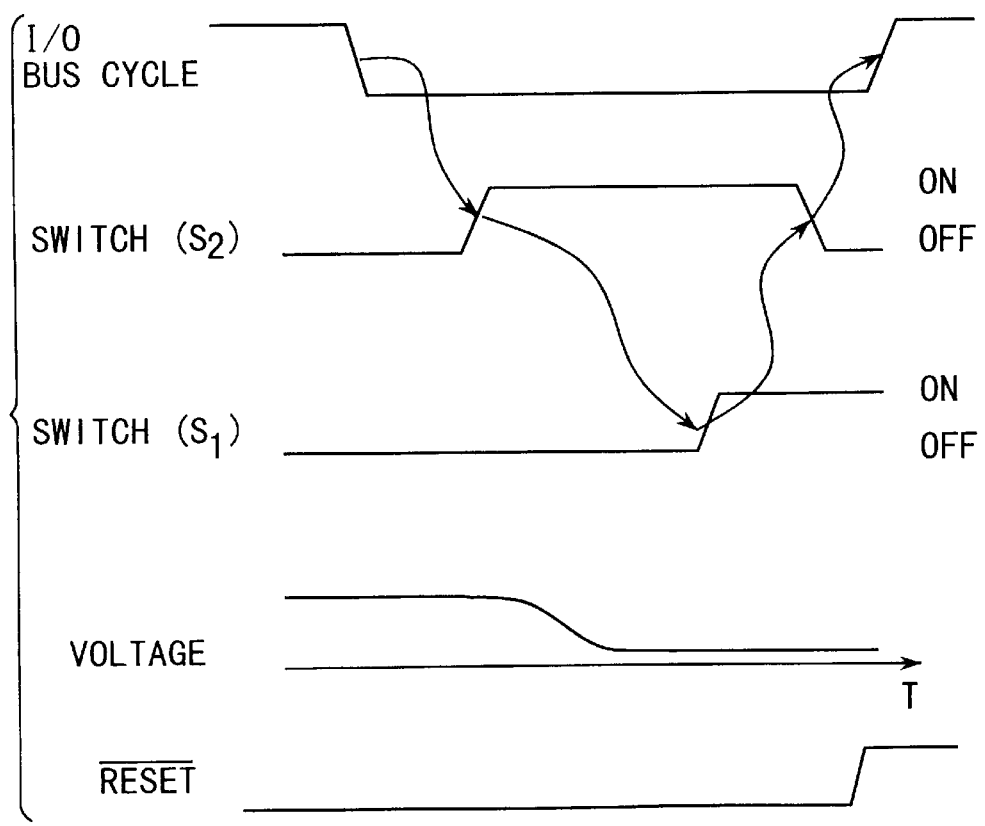
F I G. 1 3

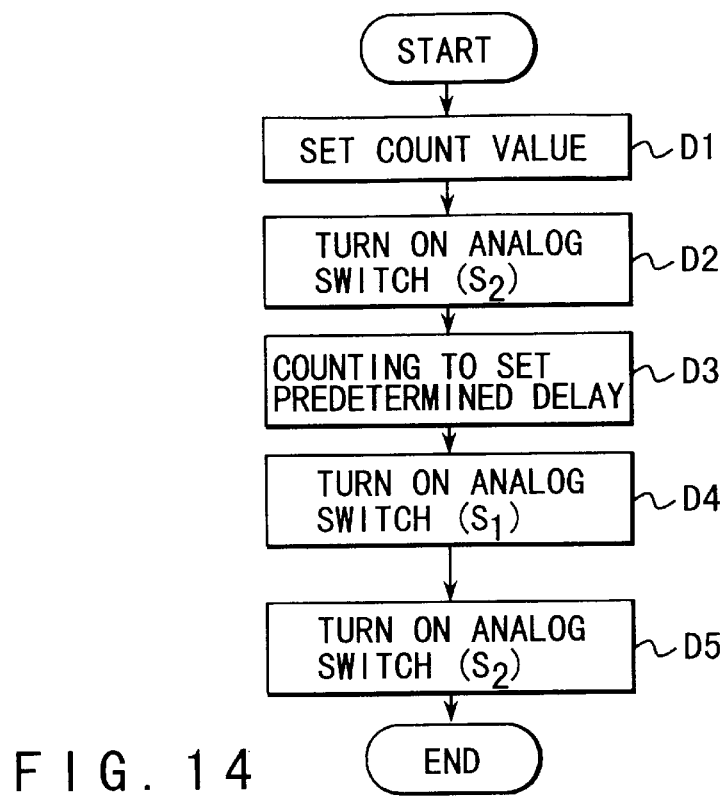
F I G. 14
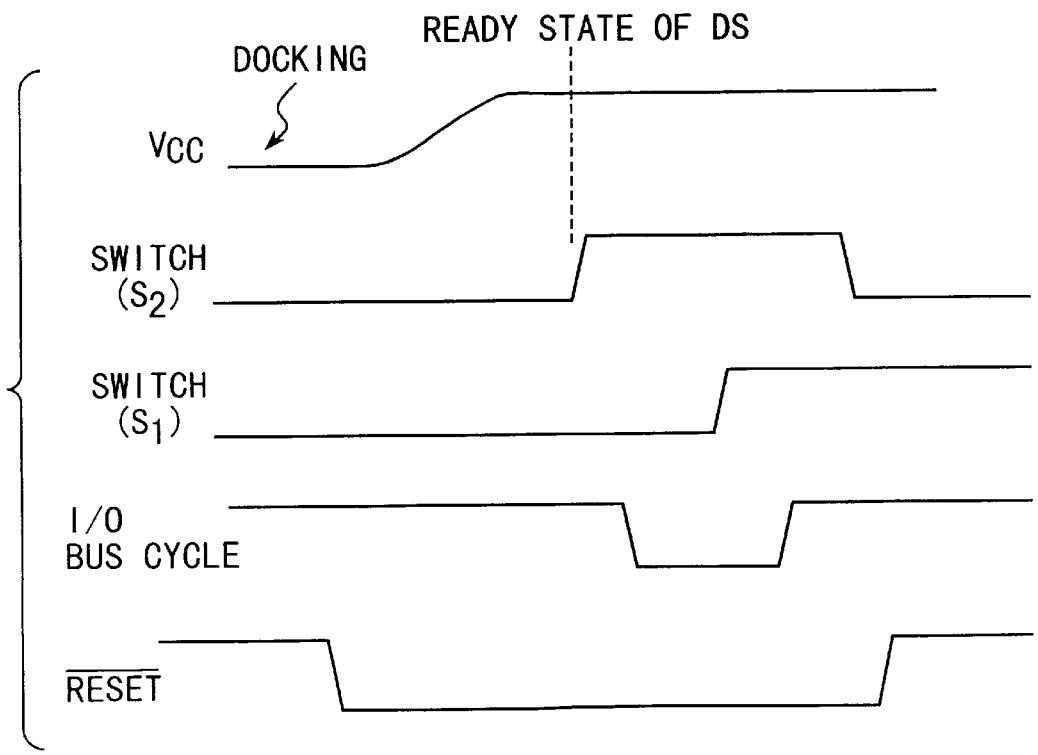
F I G. 15

COMPUTER SYSTEM HAVING EXPANSION UNIT

BACKGROUND OF THE INVENTION

The present invention relates to a computer system suitable for adaptation to, for example, a notebook type portable computer. More particularly, this invention relates to a computer system equipped with a computer and an expansion unit to and from which the computer body is attachable and detachable.

The entire contents of Japanese Patent Application No. 8-44920 filed on Mar. 1, 1996 are incorporated herein by reference.

Recently, various kinds of laptop type or notebook type personal portable computers which are easy to carry around and operable on a battery are developed such type of portable computer is generally designed to be attached to an expansion unit as needed for functional expansion.

This expansion unit has a drive bay for receiving a drive unit like a hard disk drive and expansion slots to install various kinds of option cards. Therefore, connecting a portable computer to this expansion unit as needed can easily expand the functions of that portable computer without degrading the portability of the portable computer.

A new concept called hot docking has recently been introduced. This "hot docking" can permit a peripheral device such as a CD-ROM drive to be added or unstalled while the system is in operation. Various operating systems support this hot docking function.

In connecting a portable computer to the aforementioned expansion unit, the bus in the expansion unit is connected to the bus in the portable computer. When both buses are connected while the bus cycle is being executed, therefore, it is very likely that both the portable computer and the expansion unit malfunction due to a transient phenomenon or the like. This necessitates that the connection should be made while both machines are powered off.

There is a system which has a switch on the bus of a portable computer to control the connection to the bus of an expansion unit so that both buses can be connected while the system is in operation. However, this system actually connects both buses while the bus cycle of the bus on the portable computer side is idling or until it becomes unaffected by a transient phenomenon when the switch is set on.

While an expansion unit is important to expand the functions of a portable computer, the prior art prevents the connection of the bus of the portable computer to the bus of the expansion unit while the bus cycle of the bus of the portable computer is being executed.

BRIEF SUMMARY OF THE INVENTION

It is an object of the present invention to provide a computer system which can allow the bus of a portable computer to be connected to the bus of an expansion unit during execution of the bus cycle of the portable computer only by the addition of a simple structure.

According to the first aspect of this invention, there is provided a computer system equipped with an expansion unit to be detachably attached to a computer body to functional expansion, signal lines of buses of the computer body and the expansion unit being connected together via a connector when the computer body is attached to the expansion unit, the computer body comprising: an analog switch provided on signal lines of the bus of the computer body which are to be led to the expansion unit; means for activating a power supply of the expansion unit when the computer body is attached to the expansion unit; means for resetting the expansion unit after the power supply of the expansion unit is activated; means for sending a preset value to the bus of the computer body in such a way that potential levels of the signal lines of the bus thereof become equal to those of the signal lines of the bus of the expansion unit, after the expansion unit is reset; means for setting the analog switch on after the preset value is sent to the bus of the computer body; and means for releasing a reset state of the expansion unit after the analog switch is set on, wherein the signal lines of both buses can be connected together while an execution cycle of the bus of the computer body is being executed.

In this computer system, at the time the computer body is attached to the expansion unit to couple the bus of the computer body to the bus of the expansion unit, a preset value is sent to the buses first. When the individual signal lines of the bus of the expansion unit are pulled up as the initial state, for example, a high value is sent to the buses. When the individual signal lines of the bus of the expansion unit are pulled down as the initial state, on the other hand, a low value is sent to the buses. Sending such a set value should make the potential levels of the signal lines of the bus of the computer body substantially equal to the potential levels of the signal lines of the bus of the expansion unit.

After the potential levels of the signal lines of both buses are set equal, the analog switch provided on the signal lines of the bus of the computer body is set on. Accordingly, no transient phenomenon occurs, thus allowing the signal lines of the bus of the computer body to be connected to the signal lines of the bus of the expansion unit while the bus cycle is being executed.

According to the second aspect of this invention, there is provided a computer system equipped with an expansion unit to be detachably attached to a computer body to functional expansion, signal lines of buses of the computer body and the expansion unit being connected together via a connector when the computer body is attached to the expansion unit, the computer body comprising: an analog switch provided on signal lines of the bus of the computer body which are to be led to the expansion unit, and a resistor connected to the signal lines of the bus of the computer body in parallel to the analog switch; means for activating a power supply of the expansion unit when the computer body is attached to the expansion unit; means for resetting the expansion unit after the power supply of the expansion unit is activated; means for, when a command in an execution cycle of the bus becomes active after the expansion unit has been reset, delaying the execution cycle of the bus for the command by a preset first period; means for setting the analog switch on upon passage of a preset second period after the command in the execution cycle of the bus of the computer body has become active; and means for releasing a reset state of the expansion unit after the analog switch is set on, wherein the signal lines of both buses can be connected together while a bus cycle is being executed.

In this computer system, in addition to an analog switch provided on the signal lines of the bus of the computer body, a resistor is connected to the signal lines of that bus in parallel to the analog switch. At the time the computer body is attached to the expansion unit to couple the bus of the computer body to the bus of the expansion unit, therefore, the potential levels of the signal lines of the bus of the computer body are transferred to the associated signal lines of the bus of the expansion unit regardless of the ON/OFF state of the analog switch.

According to this invention, therefore, when a command in the bus cycle becomes active, the bus cycle for that command is delayed by a first period. This period should be set long enough to completely transfer the potential levels of the individual signal lines set by that command to the associated signal lines of the bus of the expansion unit, i.e., long enough for the signal lines of the bus of the expansion unit associated with the "high" signal lines of the bus of the computer body to be saturated.

The analog switch is set on upon passage of a second period within the first period but sufficient for the complete transfer of the potential levels to the signal lines of the bus of the expansion unit passes after the command in the bus cycle has become active. By this time, the signal lines of the bus of the expansion unit which are associated with the "low" signal lines of the bus of the computer body should have gone low while the signal lines of the bus of the expansion unit which are associated with the "high" signal lines of the bus of the computer body should have gone high. As the potential levels of the signal lines of one bus match with those of the signal lines of the other bus, therefore, no transient phenomenon occurs even when the analog switch is set on.

According to the third aspect of this invention, there is provided a computer system equipped with an expansion unit to be detachably attached to a computer body to functional expansion, signal lines of buses of the computer body and the expansion unit being connected together via a connector when the computer body is attached to the expansion unit, the computer body comprising: a first analog switch provided on signal lines of the bus of the computer body which are to be led to the expansion unit, and a series circuit of a resistor and a second analog switch connected to the signal lines of the bus of the computer body in parallel to the first analog switch; means for activating a power supply of the expansion unit when the computer body is attached to the expansion unit; means for resetting the expansion unit after the power supply of the expansion unit is activated; means for setting the second analog switch on after the expansion unit is reset; means for, when a command in an execution cycle of the bus becomes active after the second analog switch has been set on, delaying the execution cycle of the bus for the command by a preset first period; means for setting the first analog switch on upon passage of a preset second period after the command in the execution cycle of the bus of the computer body has become active; means for setting the second analog switch off after the first analog switch has been set on; and means for releasing a reset state of the expansion unit after the second analog switch is set off, wherein the signal lines of both buses can be connected together while a bus cycle is being executed.

According to the fourth aspect of the present invention, there is provided a computer system equipped with an expansion unit to be detachably attached to a computer body to functional expansion, signal lines of buses of the computer body and the expansion unit being connected together via a connector when the computer body is attached to the expansion unit, the computer body comprising: a first analog switch provided on signal lines of the bus of the computer body which are to be led to the expansion unit, and a series circuit of a resistor and a second analog switch connected to the signal lines of the bus of the computer body in parallel to the first analog switch; means for activating a power supply of the expansion unit when the computer body is attached to the expansion unit; means for resetting the expansion unit after the power supply of the expansion unit is activated; means for setting the second analog switch on in response to changing state of the expansion unit into ready; means for, when a command in an execution cycle of the bus becomes active after the second analog switch has been set on, delaying the execution cycle of the bus for the command by a preset first period; means for setting the first analog switch on upon passage of a preset second period after the command in the execution cycle of the bus of the computer body has become active; means for setting the second analog switch off after the first analog switch has been set on; and means for releasing a reset state of the expansion unit after the second analog switch is set off, wherein the signal lines of both buses can be connected together while a bus cycle is being executed.

According to the third or fourth aspects, the second analog switch is connected in series to the resistor and those resistor and second analog switch are connected to the bus in parallel to the first analog switch. When and only when this second analog switch is set on only at the time the signal lines of the bus of the computer body are connected to those of the bus of the expansion unit, the potential levels can be transferred via the resistor and the status of the bus of the expansion unit in the normal operation mode is not disturbed. It is thus possible to sufficiently reduce the resistance of that resistor. This feature can sufficiently reduce the period for transferring the potential levels to the signal lines of the bus of the expansion unit as well as can connect the signal lines of the bus of the computer body to those of the bus of the expansion unit while the bus cycle is being executed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram illustrating the structure of a computer main body of a computer system according to one embodiment of this invention;

FIG. 3 is a block diagram showing the structure of a card dock to be used in the computer system of this embodiment;

FIG. 4 is a diagram illustrating how the computer main body of this embodiment is attached to the docking station;

FIG. 10 indicates timing charts of the various signals for connecting the buses according to the second pattern;

FIG. 11 is a flowchart for explaining the second pattern of procedures of connecting the buses according to this embodiment;

FIG. 12 is a block diagram for explaining the third pattern for connecting the buses according to this embodiment;

FIG. 13 indicates timing charts of the various signals for connecting the buses according to the third pattern;

FIG. 14 is a flowchart for explaining the third pattern of procedures of connecting the buses according to this embodiment; and FIG. 15 indicates timing charts of the various signals for connecting the buses according to a modification of the third pattern.

DETAILED DESCRIPTION OF THE INVENTION

Figure 2:
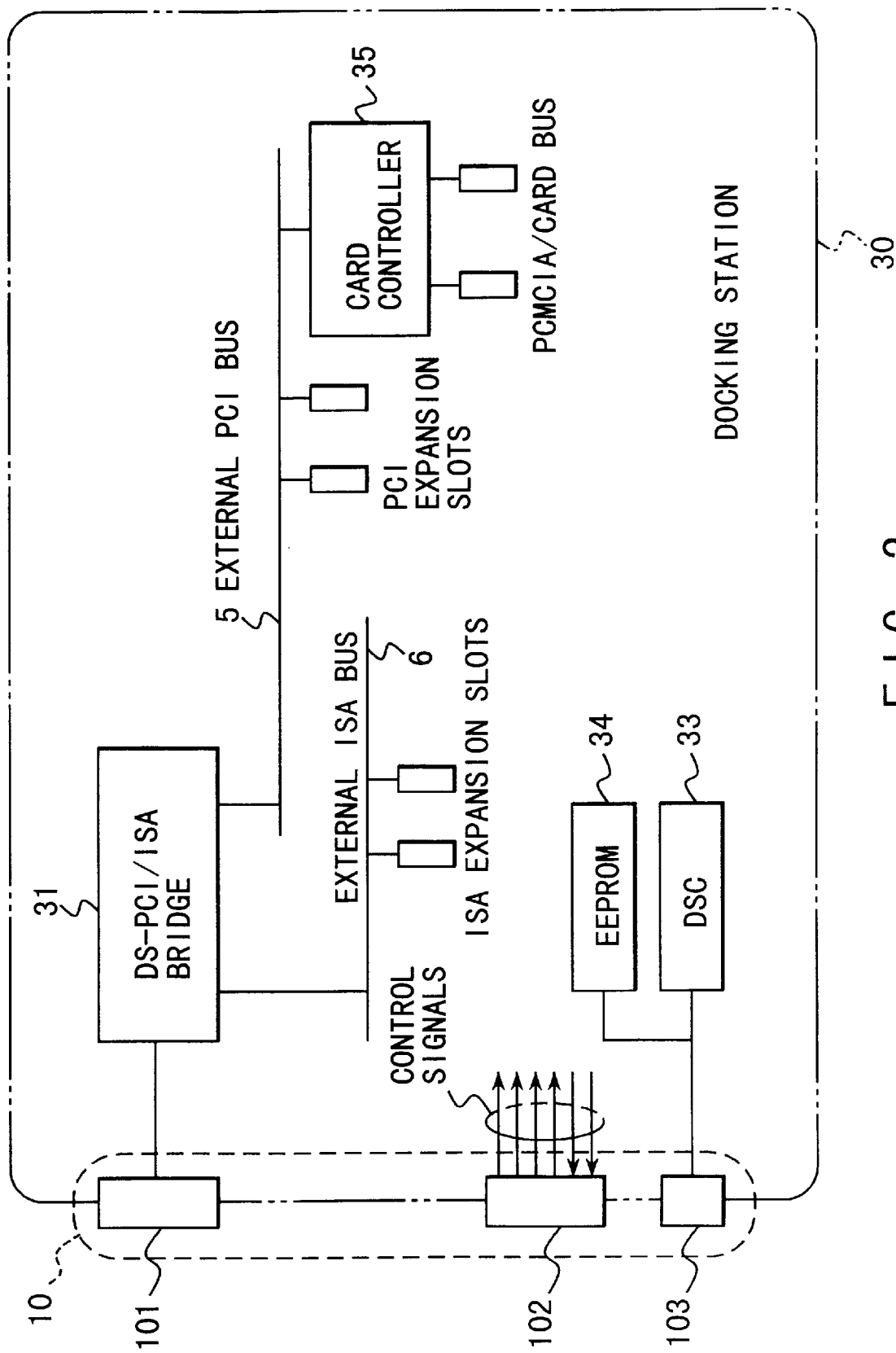
FIG. 2 is a block diagram showing the structure of a docking station to be used in the computer system of this embodiment.

A preferred embodiment of the present invention will now be described with reference to the accompanying drawings.

FIG. 1 illustrates the structure of a computer system according to one embodiment of this invention. This computer system is a notebook type or a laptop type portable computer which can be driven by a battery and on whose system board a processor bus 1, an internal PCI bus 2, an internal ISA bus 3 and an I²C bus 4 are laid out. A docking station 30 in FIG. 2 or a card dock 40 in FIG. 3 as an expansion unit for functional expansion is connected to a docking connector 10, provided on the portable computer body, as needed by a user. As illustrated, the docking connector 10 comprises three connector elements 101, 102 and 103.

Provided in the computer body are a CPU 11, a host-PCI bridge 12, a memory 13, a display controller 14, a DSP interface gate array (DSP IF GA) 15, an internal PCI-ISA bridge 16, a card controller 17, an analog switch IC 18, a BIOS ROM (Basic Input Output System Read Only Memory) 19, a HDD 20, a keyboard controller 21, a real time clock (RTC) 22, a connection control gate array 23, a power supply controller (PSC) 24, etc.

The docking station 30 is used to add expansion devices, such as a PCI expansion card, ISA expansion card, PC card, HDD and CD-ROM drive. As shown in FIG. 2, laid out in this docking station 30 are an external PCI bus 5 and an external ISA bus 6 to which a drive bay or a PCI expansion slot and an ISA expansion slot or the like are connected. A DS-PCI/ISA bridge 31, a DS controller 33, an EEPROM 34, etc. are also provided in the docking station 30.

The card dock 40 is used to add a PC card or connect an external mouse, joystick, keyboard and the like. As shown in FIG. 3, an EEPROM 43 is provided in this card dock 40.

The functions and structures of the individual components provided in the computer body in FIG. 1 will now be discussed.

The CPU 11 is realized by, for example, a microprocessor "Pentium" manufactured and sold by Intel Corporation. The processor bus 1, directly coupled to the input/output pins of this CPU 11, has a 64-bit data bus.

The memory 13 is a memory device for storing an operating system, device drivers, an application program to be run, data to be processed or the like, and is comprised of a plurality of DRAM modules. This memory 13 consists of a system memory 131 previously installed on the system board and an extended memory 132 which is to be installed as needed by a user. A synchronous DRAM, Rambus or the like is used as each DRAM module constituting those system memory 131 and extended memory 132.

This memory 13 is connected to the host-PCI bridge 12 via an exclusive memory bus having a 32-bit or 64-bit data bus. The data bus of the processor bus 1 may be used as the data bus of this memory bus. In this case, the memory bus consists of an address bus and various memory control signal lines.

The host-PCI bridge 12 is a bridge LSI which connects the processor bus 1 to the internal PCI bus 2, and serves as one of bus masters for the PCI bus 2. This host-PCI bridge 12 has a function for bi-directionally converting the bus cycle including data and addresses between the processor bus 1 and the internal PCI bus 2 and a function for controlling access to the memory 13 via the memory bus.

The internal PCI bus 2 is a clock synchronous input/output bus, which allows all the cycles on the internal PCI bus 2 to be executed synchronously. The maximum frequency of the PCI bus clock is 33 MHz. The PCI bus 2 has an address/data bus which is used in a time-divisional fashion. This address/data bus has a width of 32 bits.

The data transfer cycle on the PCI bus 2 consists of an address phase and one or more data phases following the address phase. The address and the transfer type are output in the address phase, while 8-bit, 16-bit, 24-bit or 32-bit data is output in the data phase.

Like the host-PCI bridge 12, the display controller 14 is one of the bus masters for the PCI bus 2. This display controller 14 displays image data in a video memory (VRAM) 143 on an LCD 141 or an external CRT display 142.

The DSP interface gate array 15, one PCI device, together with the a DSP 151, a modem (CODEC) 152 and a sound CODEC 153, constitutes a DSP system for executing various kinds of sound processes and telephone/data communication processing.

Under the control of an exclusive device driver program to be loaded into the memory 13 to be executed, this DSP interface gate array 15 communicates with the DSP 151, the modem (CODEC) 152 and the sound CODEC 153 to control the sound processing and communication processing using the digital signal processing function of the DSP 151.

The internal PCI-ISA bridge 16, which serves as one PCI device, is a bridge LSI for connecting the internal PCI bus 2 to the internal ISA bus 3. This internal PCI-ISA bridge 16 incorporates a PCI bus arbiter and a DMA controller. Connected to the internal ISA bus 3 are the BIOS ROM 19, the HDD 20, the keyboard controller 22, the RTC 22 and the connection control gate array 23.

The card controller 17, one PCI device, controls a PC card designed to conform to the PCMCIA specifications or card bus specifications.

The analog switch IC 18 switches between the bus connection and bus disconnection to and from the docking station 30 or the card dock 40. That is, the analog switch IC 18 is a bridge LSI which connects the internal PCI bus 2 to a docking bus 7 equivalent to an PCI bus, and serves as one PCI device. This docking bus 7 is led out via the connector element 101 of the docking connector 10 to be connected to the docking station 30. The bus connection and disconnection by this analog switch IC 18 is controlled by the connection control gate array 23. The structure of the analog switch IC 18 and the control procedures for the bus connection and disconnection characterize this invention and will be discussed later.

The BIOS ROM 19 stores the system BIOS (Basic I/O System) and is constituted of a flash memory which is programmable. This system BIOS includes an IRT routine which is executed upon system booting, device drivers for controlling various kinds of I/O devices, a system managing program and a setup routine.

The system managing program is an interrupt program which is executed in an SMM, and includes an SMI handler and various SMI service routines like a hot-key processing routine. The SMI handler is for invoking an SMI service routine in accordance with the cause for an SMI. The SMI handler invokes the hot-key processing routine when a hot-key oriented SMI has occurred. When an SMI has occurred due to another cause, the SMI handler invokes an SMI service routine associated with that cause.

The setup routine alters the setting of the operational environment of this system in accordance with the user's key-input operation.

The connection control gate array 23 is a bridge LSI to connect the internal ISA bus 3 to the I$^2$C bus 4, and incorporates a plurality of registers which can be accessed for data read/writing by the CPU 11. The use of those registers can permit the CPU 11 to communicate the power supply controller 24 on the I$^2$C bus 4. The registers for use in this embodiment may include (1) a register for holding a counter value which defines the delay length of the execution cycle of the internal PCI bus 2, (2) a register for holding a value for setting the ON/OFF of the analog switch IC and (3) a register for holding a value for setting the resetting/reset-releasing of the expansion unit.

A plurality of control signal lines to be connected to the docking station 30 are led out via the connector element 102 of the docking connector 10 from this connection control gate array 23. The aforementioned resetting/reset-releasing of the expansion unit is controlled by those control signal lines. The connection control gate array 23 detects the docking/undocking of the computer body to/from the docking station 30 or the card dock 40 and controls the analog switch IC 18 in such a manner as to prevent the expansion unit in the docking station 30 from damaged or prevent the system from malfunctioning by the plug-in/plug-out of the active lines when the computer body is connected to the docking station 30 in the power-on state (hot dock), for example.

The I$^2$C bus 4 is a bidirectional bus consisting of one clock signal line and one data line (SDA), and is led out via the connector element 103 of the docking connector 10.

The power supply controller 24 serves to power on or off the computer body in accordance with the ON/OFF action of the power switch, and performs power supply control according to the docking/undocking of the computer body to/from the docking station 30.

The components of the docking station 30 in FIG. 2 will now be described on the premise that the computer body is attached to the docking station 30 in this embodiment.

As described earlier, the docking station 30 is an expansion unit which can be attached to the portable computer body in a detachable manner. FIG. 4 illustrates how a computer body 100 according to this embodiment is attached to the docking station 30.

The DS-PCI/ISA bridge 31 provided inside the docking station 30 having the illustrated outlook is a bridge LSI that connects the docking bus 7, which is led out of the computer body to the docking station 30, to the external PIC bus 5 and the external ISA bus 6. This DS-PCI/ISA bridge 31 is one of PCI devices.

The DS controller 33 is a microcomputer which controls the power ON/OFF operation of the docking station 30 and the docking/undocking of the portable computer body to/from the docking station 30. This DS controller 33 communicates the power supply controller 24 and the connection control gate array 23 of the computer body using the I$^2$C bus 4.

Stored in the EEPROM 34 is PnP information necessary for the plug-and-play, such as the attribute (address, DMA channel, IRQ number, etc.) of the expansion card or the like which is installed in the expansion slot of the docking station 30. This PnP information is read from the EEPROM 34 by the connection control gate array 23 via the I$^2$C bus 4 under the control of the system BIOS of the BIOS ROM 19 when the computer body is docked in the docking station 30 or when the computer body or the docking station 30 is powered on.

A card controller 35, like the card controller 17 in the computer body, controls a PC card which conforms to the PCMCIA/card specifications.

Figure 5:
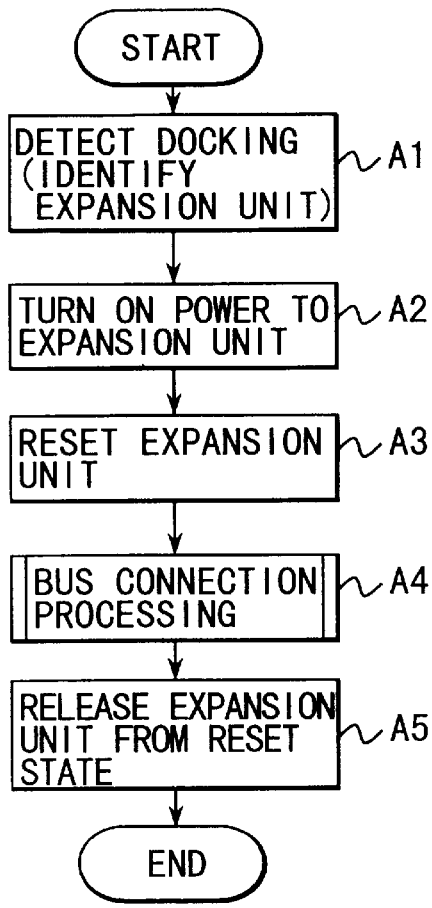
FIG. 5 is a flowchart for explaining a sequence of operations at the time of connecting buses when the computer main body of this embodiment is attached to the docking station.

Referring now to FIG. 5, a description will be given of a sequence of operations at the time of connecting buses when the computer body is attached to the docking station 30.

The system BIOS detects the attachment to the docking station 30 by the occurrence of an SMI (at the time of hot docking) or by referring to a predetermined register in the connection control gate array 23 (upon booting) (step A1). At the booting time, the connection control gate array 23 identifies the type by reading the EEPROM 34 in the docking station 30 via the I$^2$C bus 4.

Next, the system BIOS instructs the power supply controller 24 to turn on the power of the docking station 30 (step A2).

After the docking station 30 is powered on, the system BIOS instructs the connection control gate array 23 to reset the docking station 30 (step A3). This instruction is executed by using the aforementioned register.

Then, the system BIOS writes predetermined values in various registers in the connection control gate array 23 to allow the connection control gate array 23 to establish bus connection (step A4). There are several patterns in making the connection, which characterize this invention, so that they will be discussed later one by one.

Finally, the system BIOS instructs the connection control gate array 23 to release the reset state of the docking station 30 (step A5).

Thereafter, the external PCI bus 5 and the external ISA bus 6 in the docking station 30 are considered as connected to the internal PCI bus 2 of the computer body, and the normal operation takes place.

<First Pattern>

The first pattern for the structure of the analog switch IC 18 and the connection procedures will be discussed with reference to FIGS. 6 through 8.

Figure 6:
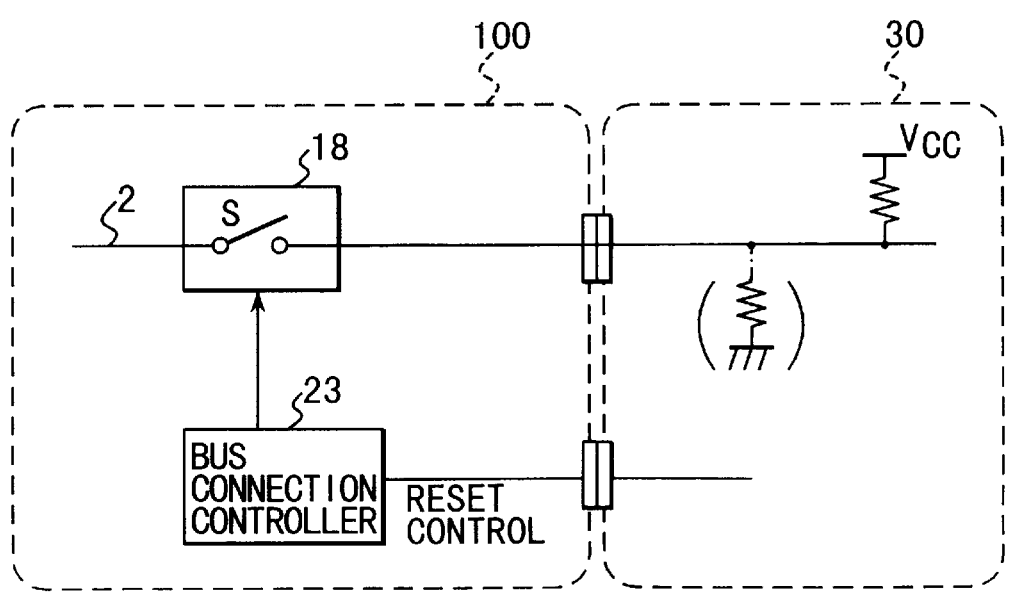
FIG. 6 is a block diagram for explaining the first pattern for connecting the buses according to this embodiment.

As shown in FIG. 6, an analog switch S is provided in the analog switch IC 18 in such a way as to be connected to the internal PCI bus 2. The ON/OFF action of this analog switch S is controlled by the connection control gate array 23. It is assumed that the bus (the external PCI bus 5, external ISA bus 6) of the docking station 30 has been pulled up or pulled down (dotted line connection of FIG. 6) as the initial state.

Figure 7:
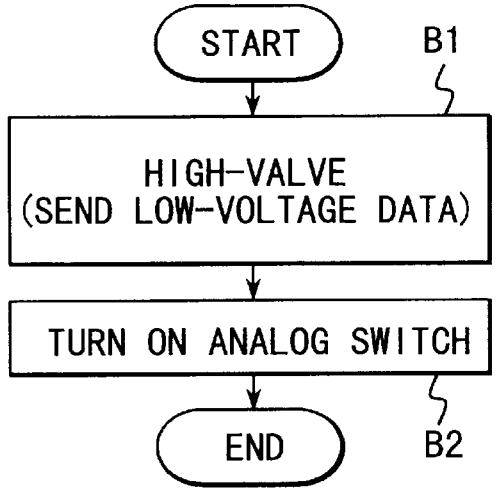
FIG. 7 is a flowchart for explaining the first pattern of procedures of connecting the buses according to this embodiment.

The system BIOS sends either a high value or a low value to the internal PCI bus 2 (step B1 in FIG. 7).

When the bus of the docking station 30 is pulled up as the initial state, for example, a high value is sent to the bus. When the bus of the docking station 30 is pulled down as the initial state, on the other hand, a low value is sent to the bus.

Consequently, the potential levels of the signal lines of the internal PCI bus 2 of the computer body 100 should be substantially equal to the potential levels of the signal lines of the bus (the external PCI bus 5, external ISA bus 6) of the docking station 30.

Figure 8:
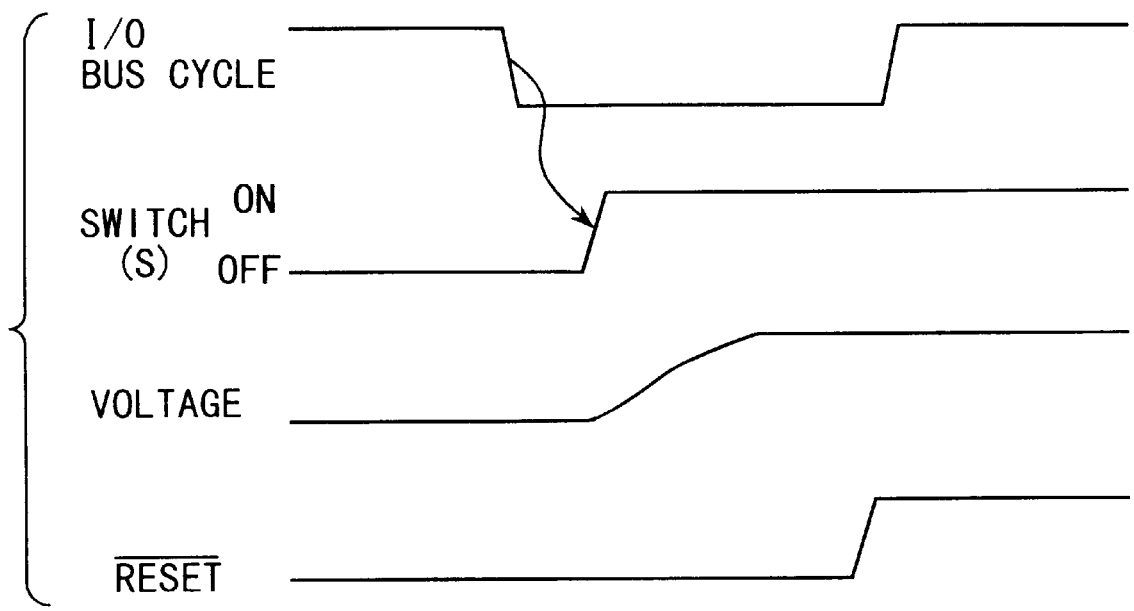
FIG. 8 indicates timing charts of the various signals for connecting the buses according to the first pattern.

After the potential levels of the signal lines of both buses are set equal, the system BIOS instructs the connection control gate array 23 to set the analog switch S on (step B2 in FIG. 7, referring to FIG. 8).

Accordingly, no transient phenomenon occurs, thus allowing the signal lines of the bus of the computer main body 100 to be connected to the signal lines of the bus of the docking station 30 while the bus cycle is being executed.

The above described processing is executed during a predetermined bus cycle. In the predetermined bus cycle, a flag is set in a preset register of the bus connection control GA 23.

<Second Pattern>

The second pattern for the structure of the analog switch IC 18 and the connection procedures will be discussed with reference to FIGS. 9 through 11.

Figure 9:
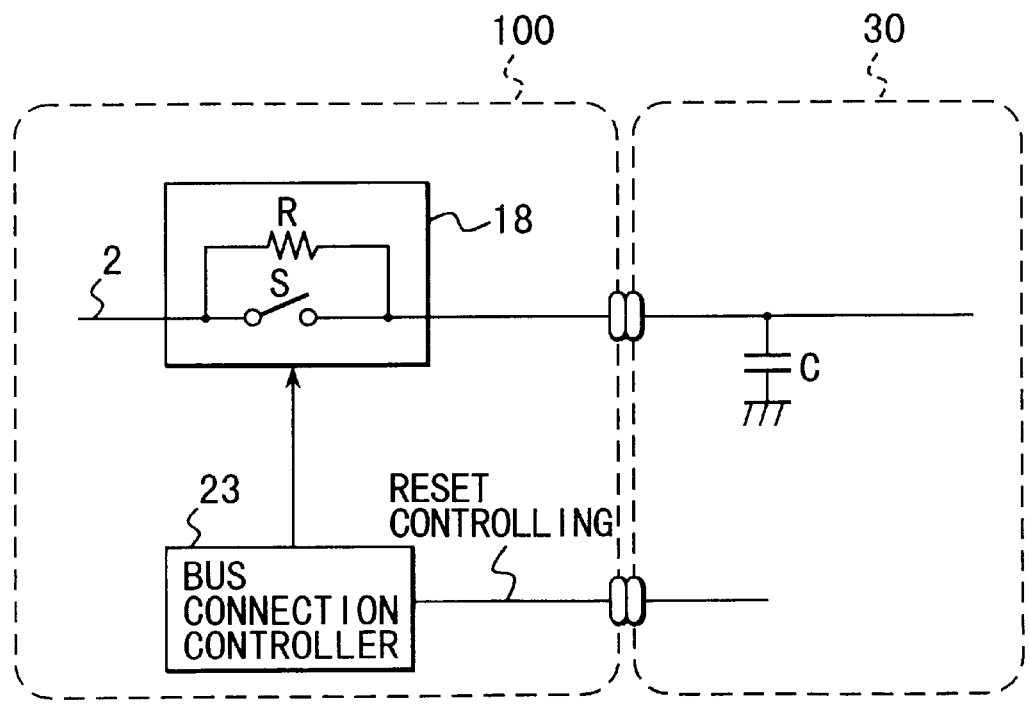
FIG. 9 is a block diagram for explaining the second pattern for connecting the buses according to this embodiment.

As shown in FIG. 9, an analog switch S is provided in the analog switch IC 18 in such a way as to be connected to the internal PCI bus 2, and a resistor R is connected to the internal PCI bus 2 in parallel to this analog switch S. The ON/OFF action of this analog switch S is controlled by the connection control gate array 23.

When the computer body 100 is attached to the docking station 30, therefore, the potential levels of the signal lines of the bus of the computer body 100 are transferred to the associated signal lines of the bus (the external PCI bus 5, external ISA bus 6) of the docking station 30 from the parallel-connected resistor R (voltage in FIG. 10).

When a command in the execution cycle (predetermined bus cycle) of the internal PCI bus 2 becomes active, therefore, the bus cycle for that command is delayed by a previously set period. This period should be set long enough to completely transfer the potential levels of the individual signal lines set by that command to the associated signal lines of the bus (the external PCI bus 5, external ISA bus 6) of the docking station 30, i.e., long enough for the signal lines of the bus (the external PCI bus 5, external ISA bus 6) of the docking station 30 associated with the "high" signal lines of the bus of the computer body 100 to be saturated (referring to FIG. 10). This period is determined based on the load capacitance of the docking station 30. When the card dock 40 is connected, therefore, the period is determined on the basis of the load capacitance of the card dock 40. The load capacitance indicates sum of the stray capacitances, input capacitance of the IC mounted on the docking station 30, and output capacitance of the same.

The delay of this execution cycle is performed by setting a counter value in a predetermined register in the connection control gate array 23. That is, the connection control gate array 23 delays a ready signal to be sent to the CPU 11 by the number of clocks equivalent to the counter value set in that register, delaying the execution cycle of the internal PCI bus 2 as a consequence.

The system BIOS instructs the connection control gate array 23 to set on the analog switch S after the command in the bus cycle has become active and within this delay period (FIG. 10). By this time, the signal lines of the bus (the external PCI bus 5, external ISA bus 6) of the docking station 30 which are associated with the "low" signal lines of the bus of the computer body 100 should have gone low while the signal lines of the bus (the external PCI bus 5, external ISA bus 6) of the docking station 30 which are associated with the "high" signal lines of the bus of the computer body 100 should have gone high. As the potential levels of the signal lines of one bus match with those of the signal lines of the other bus, therefore, no transient phenomenon occurs.

When a command in the execution cycle of the internal PCI bus 2 becomes active, the system BIOS sets a counter value in a predetermined register in the connection control gate array to delay the bus cycle for this command by a previously set period (step C1 in FIG. 11).

The setting of this counter values delays the bus cycle for a predetermined period (step C2) during which (after a sufficient time for the potential levels of the signal lines set by the command to be completely transferred to the signal lines of the bus (the external PCI bus 5, external ISA bus 6) of the docking station 30) the system BIOS instructs the connection control gate array 23 to set on the analog switch S (step C3).

This prevents the occurrence of a transient phenomenon and can allow the signal lines of the bus of the computer body to be connected to those of the bus of the docking station 30 while the bus cycle is being executed. In the second pattern, the docking station 30 can be pulled up or pulled down.

<Third Pattern>

The third pattern for the structure of the analog switch IC 18 and the connection procedures will be discussed with reference to FIGS. 12 through 14.

As shown in FIG. 12, an analog switch S1 is provided in the analog switch IC 18 in such a way as to be connected to the internal PCI bus 2, and a series circuit of a resistor R1 and an analog switch S2 is connected to the internal PCI bus 2 in parallel to this analog switch S1. The ON/OFF actions of this analog switches S1 and S2 are controlled by the connection control gate array 23.

This structure is the structure of the second pattern to which the analog switch S2 is added. The presence of the analog switch S2 is effective in the following case.

Assuming that a resistor R2 is provided to pull up the bus in the docking station 30 and the analog switch S2 is not provided as shown in FIG. 12, the state of the bus of the docking station 30 in the normal operation mode cannot be guaranteed unless the resistance of the resistor R1 is set sufficiently large as compared with the resistance of the resistor R2. For example, the combination of R1=1K, R2=10K can be applied to the resistors R1 and R2.

Increasing the resistance of this resistor R1 however leads to a longer period for transferring the potential levels of the signal lines of the bus of the computer body to the signal lines of the bus of the docking station 30. During this transfer period, the bus cycle is delayed so that the CPU is waited longer than necessary. This adversely affect real-time processing.

According to the third patter, therefore, the analog switch S2 is connected in series to the resistor R1 having a smaller resistance and is set on when and only when the signal lines of the bus of the computer body are connected to those of the bus of the docking station 30 (referring to FIG. 13).

Accordingly, the potential levels are transferred via the resistor R1 having a smaller resistance to the signal lines of the bus of the docking station 30 (referring to FIG. 13).

As discussed in the foregoing description of the second pattern, the analog switch S1 is set on after the command in the bus cycle has become active and within this delay period (referring to FIG. 13), then the analog switch S2 is set off.

This can make the potential levels of the signal lines of one bus equal to those of the signal lines of the other bus in a short period of time, and can prevent the occurrence of a transient phenomenon when the analog switch is set on.

The operational procedures in this pattern will be discussed with reference to FIG. 14.

When a command in the execution cycle of the internal PCI bus 2 becomes active, the system BIOS sets a counter value in a predetermined register in the connection control gate array to delay the bus cycle for this command by a previously set period (step D1).

The system BIOS instructs the connection control gate array 23 to set on the analog switch S2 (step D2).

While the bus cycle is delayed for a predetermined period (step D3), the system BIOS instructs the connection control gate array 23 to set on the analog switch S1 (step D4).

Thereafter, the system BIOS instructs the analog switch S2 to be set off (step D5).

This can make the potential levels of the signal lines of one bus equal to those of the signal lines of the other bus in a short period of time, can prevent the occurrence of a transient phenomenon and does not affect the subsequent normal operation mode. It is thus possible to connect the signal lines of the bus of the computer body to those of the bus of the docking station 30 while the bus cycle is being executed.

<Fourth Pattern>

The above described third pattern can be modified. In the modification of the fourth pattern, switch S2 is turned on in response to the setting the docking station in the ready state. This time sequence is shown in FIG. 15.

The switch S1 is turned on during operation of the predetermined bus cycle as in the case of the third pattern. Therefore, the fourth pattern has the effect of the third pattern in a like manner.

According to this invention, as described above, the bus of the computer body is connected to the bus of the expansion unit after the potential levels of the signal lines of the bus of the computer body are made equal to those of the signal lines of the bus of the expansion unit, it is possible to connect the signal lines of the bus of the computer body to those of the bus of the expansion unit while the bus cycle is being executed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A computer system equipped with an expansion unit to be detachably attached to a computer body for functional expansion, signal lines of buses of said computer body and said expansion unit being connected together via a connector when said computer body is attached to said expansion unit, said computer body comprising:

an analog switch provided on said signal lines of said bus of said computer body which are to be led to said expansion unit;

means for activating a power supply of said expansion unit when said computer body is attached to said expansion unit;

means for resetting said expansion unit after said power supply of said expansion unit is activated;

means for sending a preset value to said bus of said computer body in such a way that potential levels of said signal lines of said bus of said computer body become equal to those of said signal lines of said bus of said expansion unit, after said expansion unit is reset;

means for setting said analog switch on after said preset value is sent to said bus of said computer body; and means for releasing a reset state of said expansion unit after said analog switch is set on, wherein said signal lines of said buses of said computer body and said expansion unit are connectable together while an execution cycle of said bus of said computer body is being executed.

2. The computer system according to claim 1, wherein said preset value to be to said bus of said computer body is either a high value or a low value.

3. A computer system equipped with an expansion unit to be detachably attached to a computer body for functional expansion, signal lines of buses of said computer body and said expansion unit being connected together via a connector when said computer body is attached to said expansion unit, said computer body comprising:

an analog switch provided on said signal lines of said bus of said computer body which are to be led to said expansion unit, and a resistor connected to said signal lines of said bus of said computer body in parallel to said analog switch;

means for activating a power supply of said expansion unit when said computer body is attached to said expansion unit;

means for resetting said expansion unit after said power supply of said expansion unit is activated;

means for, when a command in an execution cycle of said bus becomes active after said expansion unit has been reset, delaying said execution cycle of said bus for said command by a preset first period;

means for setting said analog switch on upon passage of a preset second period after said command in said execution cycle of said bus of said computer body has become active; and means for releasing a reset state of said expansion unit after said analog switch is set on, wherein said signal lines of said buses of said computer body and said expansion unit are connectable together while a bus cycle is being executed.

4. The computer system according to claim 3, wherein said first period is set longer than said second period.

5. A computer system equipped with an expansion unit to be detachably attached to a computer body for functional expansion, signal lines of buses of said computer body and said expansion unit being connected together via a connector when said computer body is attached to said expansion unit, said computer body comprising:

a first analog switch provided on said signal lines of said bus of said computer body which are to be led to said expansion unit, and a series circuit of a resistor and a second analog switch connected to said signal lines of said bus of said computer body in parallel to said first analog switch;

means for activating a power supply of said expansion unit when said computer body is attached to said expansion unit;

means for resetting said expansion unit after said power supply of said expansion unit is activated;

means for setting said second analog switch on after said expansion unit is reset;

means for, when a command in an execution cycle of said bus becomes active after said second analog switch has been set on, delaying said execution cycle of said bus for said command by a preset first period;

means for setting said first analog switch on upon passage of a preset second period after said command in said execution cycle of said bus of said computer body has become active;

means for setting said second analog switch off after said first analog switch has been set on; and means for releasing a reset state of said expansion unit after said second analog switch is set off, wherein said signal lines of said buses of said computer body and said expansion unit are connectable together while a bus cycle is being executed.

6. The computer system according to claim 5, wherein said first period is set longer than said second period.

7. A computer system equipped with an expansion unit to be detachably attached to a computer body said functional expansion, signal lines of buses of said computer body and said expansion unit being connected together via a connector when said computer body is attached to said expansion unit, said computer body comprising:

a first analog switch provided on said signal lines of said bus of said computer body which are to be led to said expansion unit, and a series circuit of a resistor and a second analog switch connected to said signal lines of said bus of said computer body in parallel to said first analog switch;

means for activating a power supply of said expansion unit when said computer body is attached to said expansion unit;

means for resetting said expansion unit after said power supply of said expansion unit is activated;

means for setting said second analog switch on in response to changing state of said expansion unit into ready;

means for, when a command in an execution cycle of said bus becomes active after said second analog switch has been set on, delaying said execution cycle of said bus for said command by a preset first period;

means for setting said first analog switch on upon passage of a preset second period after said command in said execution cycle of said bus of said computer body has become active;

means for setting said second analog switch off after said first analog switch has been set on; and means for releasing a reset state of said expansion unit after said second analog switch is set off, wherein said signal lines of said buses of said computer body and said expansion unit are connectable together while a bus cycle is being executed.

8. The computer system according to claim 7, wherein said first period is set longer than said second period.

9. A method of controlling buses connection between a computer body and an expansion unit to be detachably attached to said computer body, said computer body having a switch provided on a bus of said computer body which are to be led to said expansion unit, said method comprising the steps of:

activating a power supply of said expansion unit when said computer body is attached to said expansion unit;

resetting said expansion unit after said powersupply of said expansion unit is activated;

sending a preset value to said bus of said computer body so that a potential level of said bus of said computer body becomes equal to a potential level of a bus of said expansion unit, after said expansion unit is reset;

turning on said switch after said preset value is sent to said bus of said computer body while an execution cycle of said bus of said computer is executed; and releasing a reset state of said expansion unit after the switch is turned on.

10. A busses connection control method according to claim 9, wherein said preset value to be set to said bus of said computer body is either a high value or a low value.

11. A method of controlling buses connection between a computer body and an expansion unit to be detachably attached to said computer body, said computer body having a switch provided on a bus of said computer body which are to be led to said expansion unit and a registor connected to said bus of said computer body in parallel to said switch, said method comprising the steps of:

activating a power supply of said expansion unit when said computer body is attached to said expansion unit;

resetting said expansion unit after said power supply of said expansion unit is activated;

delaying an execution cycle of said bus of said computer body by a preset first period when a command in said execution cycle becomes active after said expansion unit is reset;

turning on said switch upon passage of a preset second period after said command in said execution cycle becomes active; and releasing a reset state of said expansion unit after said switch is turned on.

12. A buses connection control method according to claim 11, wherein said first period is set longer than said second period.

13. A method of controlling buses connection between a computer body and an expansion unit to be detachably attached to said computer body, said computer body having a first switch provided on a bus of said computer body which are to be led to said expansion unit and a series circuit of a resistor and a second switch connected to said bus of said computer body in parallel to said first switch, said method comprising the steps of:

activating a power supply of said expansion unit when said computer body is attached to said expansion unit;

resetting said expansion unit after said power supply of said expansion unit is activated;

turning on said second switch after said expansion unit is reset;

delaying an execution cycle of said bus of said computer body by a preset first period when a command in said execution cycle becomes active after said expansion unit is reset;

turning on said first switch upon passage of a preset second period after said command in said execution cycle becomes active;

turning off said second switch after said first switch is turned off; and releasing a reset state of said expansion unit after said second switch is turned off.

14. A buses connection control method according to claim 13, wherein said first period is set longer than said second period.

15. A method of controlling buses connection between a computer body and an expansion unit to be detachably attached to said computer body, said computer body having a first switch provided on a bus of said computer body which are to be led to said expansion unit and a series circuit of a resistor and a second switch connected to said bus of said computer body in parallel to said first switch, said method comprising the steps of:

activating a power supply of said expansion unit when said computer body is attached to said expansion unit;

resetting said expansion unit after said power supply of said expansion unit is activated;

turning on said second switch in response to changing state of said expansion unit into ready;

delaying an execution cycle of said bus of said computer body by a preset first period when a command in said execution cycle becomes active after said expansion unit is reset;

turning on said first switch upon passage of a preset second period after said command in said execution cycle becomes active;

turning off said second switch after said first switch is turned off; and releasing a reset state of said expansion unit after said second switch is turned off.

16. A buses connection control method according to claim 15, wherein said first period is set longer than said second period.

* * * * *

UNITED STATES PATENT AND TRADEMARK OFFICE
CERTIFICATE OF CORRECTION

PATENT NO. :
DATED : 5,901,292
INVENTOR(S) : May 4, 1999
Nishigaki et al.

It is certified that error appears in the above-identified patent and that said Letters Patent is hereby corrected as shown below:

Claim 2, column 12, line 17, after "to be", insert --sent--.

Claim 3, column 12, line 29, "tosaid" should read --to said--.

Claim 9, column 13, line 66, "w hen" should read --when--.

Claim 9, column 14, line 1, "powersupply" should read -- power supply--.

Claim 10, column 14, line 12, "busses" should read -- buses--.

Claim 11, column, 14, line 19, "registor" should read --resistor--.

Signed and Sealed this

Twenty-third Day of November, 1999

Attest:

Q. TODD DICKINSON

*Attesting Officer*          *Acting Commissioner of Patents and Trademarks*